No. 641,936. Patented Jan. 23, 1900.
E. R. CHILDS & G. W. CANTRELL.
LATTICED OR LEADED GLASS.
(Application filed Aug. 9, 1899.)
(No Model.)
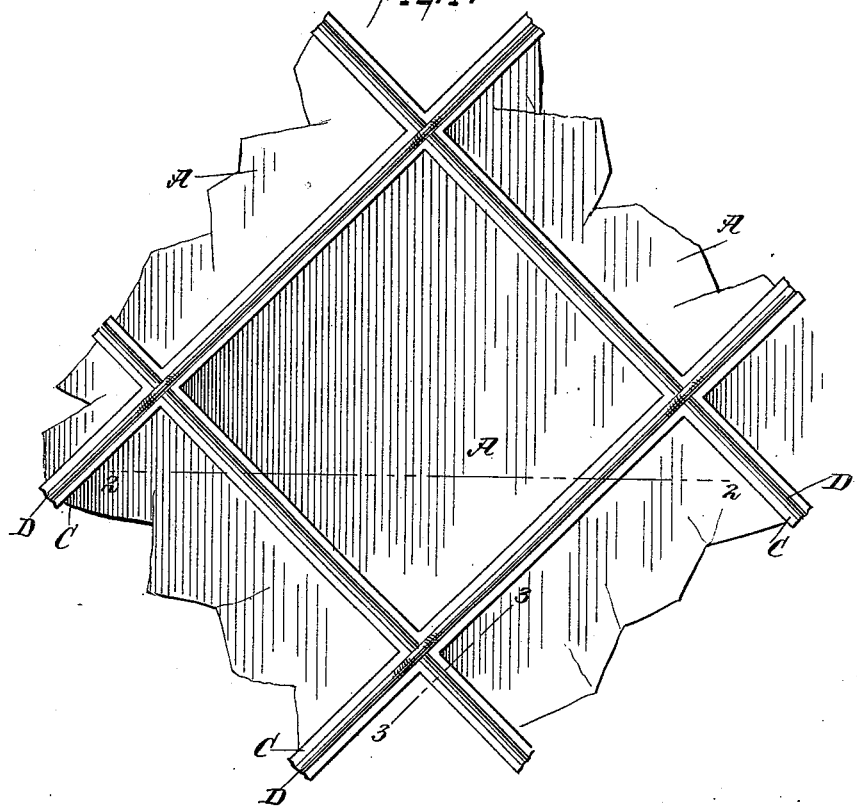
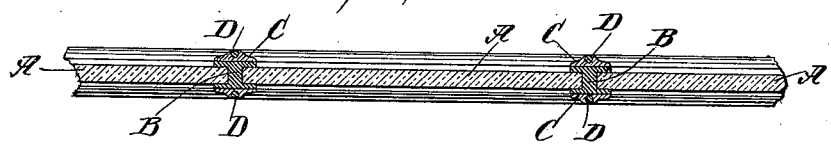
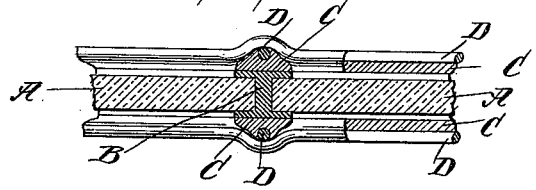
WITNESSES:
INVENTORS
ATTORNEYS

UNITED STATES PATENT OFFICE.

EDWIN R. CHILDS AND GEORGE W. CANTRELL, OF SPOKANE, WASHINGTON.

LATTICED OR LEADED GLASS.

SPECIFICATION forming part of Letters Patent No. 641,936, dated January 23, 1900.

Application filed August 9, 1899. Serial No. 726,660. (No model.)

*To all whom it may concern:*

Be it known that we, EDWIN R. CHILDS and GEORGE W. CANTRELL, of Spokane, in the county of Spokane and State of Washington, have invented a new and Improved Latticed or Leaded Glass, of which the following is a full, clear, and exact description.

The invention relates to glass-window ornamentation; and its object is to provide certain new and useful improvements in latticed or leaded glass whereby the joints are securely made without danger of parting and the glass panes or pieces are held in position.

The invention consists of novel features and parts and combinations of the same, as will be fully described hereinafter and then pointed out in the claims.

A practical embodiment of our invention is represented in the accompanying drawings, forming a part of this specification, in which similar characters of reference indicate corresponding parts in all the views.

Figure 1 is a face view of the improvement. Fig. 2 is a sectional side elevation of the same on the line 2 2 in Fig. 1. Fig. 3 is an enlarged cross-section of the same on the line 3 3 in Fig. 1, and Fig. 4 is a perspective view of the came.

The panes of glass A for forming the window are fitted into the sides of the cames B in the usual manner, and when the several panes for forming the window have been thus assembled then the faces of the cames are floated with layers C of solder or tin, and in these layers are embedded wires D, of copper or other suitable material, the wires at the joints of the cames crossing over one another, as is plainly indicated in Fig. 3, so that a wire extends from one side of the window to the other. By the construction described the several cames are securely bound together by the layers of solder, and the wires extend in the layers from one side of the window to the other to prevent the joints from parting and to hold the panes very securely in place in the cames. It is understood that the wires are placed in position in the layers C when the latter are in a melted condition, so that said wires are firmly embedded in the layers and securely adhere thereto.

By using copper wire it readily expands when placed in the melted solder, and when the solder cools, and with it the wire, then the wire contracts and exerts an equal tension over the face of the window and keeps the several parts securely in position.

It will be noted that by the construction described rods are entirely done away with, yet the work is rendered strong and serviceable.

Having thus fully described our invention, we claim as new and desire to secure by Letters Patent—

1. Leaded glass, comprising cames for receiving the panes, and reinforcing-wires soldered to the faces of the cames, as set forth.

2. Leaded glass, comprising cames for receiving the panes, a layer of solder on each face of each came, and wires embedded in said layers, as set forth.

3. Leaded glass, comprising cames for receiving the panes, a layer of solder on each face of each came, and wires embedded in said layers, the wires crossing over one another at the joints of the cames, as set forth.

EDWIN R. CHILDS.
GEORGE W. CANTRELL.

Witnesses:
H. M. STEPHENS,
GEORGE HERRIOTT.